United States Patent
Kreiner et al.

(10) Patent No.: US 10,433,136 B2
(45) Date of Patent: Oct. 1, 2019

(54) WIRELESS NETWORK ENHANCEMENTS VIA INDUCTANCE LOOPS AS ANTENNAS

(71) Applicants: AT&T Intellectual Property I, L.P., Atlanta, GA (US); AT&T Mobility II LLC, Atlanta, GA (US)

(72) Inventors: Barrett Kreiner, Woodstock, GA (US); Ryan Schaub, Peachtree Corners, GA (US); Robert Shively, Suwanee, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 34 days.

(21) Appl. No.: 15/635,381

(22) Filed: Jun. 28, 2017

(65) Prior Publication Data

US 2019/0007785 A1      Jan. 3, 2019

(51) Int. Cl.
*H04W 4/80* (2018.01)
*H04B 5/00* (2006.01)
*H04W 84/12* (2009.01)

(52) U.S. Cl.
CPC ............ *H04W 4/80* (2018.02); *H04B 5/0081* (2013.01); *H04W 84/12* (2013.01)

(58) Field of Classification Search
CPC ... H04B 7/26; G08G 1/00; G08G 1/01; G08G 1/02; G08G 1/14; G08G 1/042; G08G 1/0104; G08G 1/0116; G08G 1/0133; G08G 1/141; G08G 1/145; Y02D 70/142; Y02D 70/144; Y02D 70/162; Y02D 70/449
See application file for complete search history.

(56) References Cited

U.S. PATENT DOCUMENTS

| | | | |
|---|---|---|---|
| 4,639,689 | A | 1/1987 | Bartlett |
| 4,668,951 | A * | 5/1987 | Duley et al. |
| 6,433,705 | B2 | 8/2002 | Yamazaki |
| 6,483,443 | B1 | 11/2002 | Lees et al. |
| 7,880,643 | B2 | 2/2011 | Brega et al. |
| 8,918,270 | B2 | 12/2014 | Wang |
| 2004/0056778 | A1* | 3/2004 | Hilliard |
| 2009/0029645 | A1* | 1/2009 | Leroudier |
| 2013/0063282 | A1 | 3/2013 | Baldwin et al. |

(Continued)

FOREIGN PATENT DOCUMENTS

FR          2878080          5/2006

*Primary Examiner* — Marsha D Banks Harold
*Assistant Examiner* — Dharmesh J Patel
(74) *Attorney, Agent, or Firm* — Hartman & Citrin LLC (57) ABSTRACT

Concepts and technologies disclosed herein are directed to wireless network enhancements via inductance loops as antennas. According to one aspect disclosed herein, a roadside system can measure inductance of an inductance loop associated with a road. The roadside system can determine whether the inductance of the inductance loop is greater than a baseline. If the inductance of the inductance loop is greater than the baseline, the roadside system can determine that a vehicle is positioned over the inductance loop and can utilize the inductance loop to activate a roadside area network. The roadside system can connect a user device to the roadside system via the roadside area network. The roadside system can include a connection to a network via a backhaul to enable communication between the user device and the network.

13 Claims, 8 Drawing Sheets

(56) References Cited

U.S. PATENT DOCUMENTS

2014/0244145 A1\* 8/2014 Neel et al.
2017/0034042 A1 2/2017 Gross et al.
2017/0099079 A1 4/2017 Gross et al.

\* cited by examiner

WIRELESS NETWORK ENHANCEMENTS VIA INDUCTANCE LOOPS AS ANTENNAS

BACKGROUND

Wireless technologies require antennas to transmit and receive information. Normally, antennas are tuned, shaped, and focused to particular frequencies and/or directions to maximize transmission/reception signal strength and to reduce interference. Installation of such antennas is time consuming, geographically challenging, and costly. Coverage is a key selling point for any wireless service provider. The overuse of a geographic location's shared frequency spectrum can impact wireless services at least as much as a lack of signal.

In the United States, many roads are designed to implement an inductance loop sensor to detect the presence of a vehicle. A typical installation includes an inductance loop sensor embedded in the road by a Department of Transportation. The inductance loop sensor can sense the metal of the vehicle by very low frequency sympathetic oscillation. Multiple inductance loops can be integrated to detect the speed of a car. A given inductance loop might have one or more cars positioned over it at any given time. For example, at a stoplight, one or more cars might be stopped over an inductance loop for several minutes, and while stopped, there is a high probability of increased data use by connected vehicles, passengers, through hands-free interfaces, and drivers, such as: map/route/traffic information, texting, checking email, checking social media, and the like— regardless of the legality. Wireless service providers often see usage spikes in the cell sites that serve these locations, particularly when traffic is heavy and the likelihood of multiple cars stopped at a given intersection is higher.

SUMMARY

Concepts and technologies disclosed herein are directed to wireless network enhancements via inductance loops as antennas. According to one aspect of the concepts and technologies disclosed herein, a roadside system can measure inductance of an inductance loop associated with a road. The roadside system can determine whether the inductance of the inductance loop is greater than a baseline. In response to determining that the inductance of the inductance loop is greater than the baseline, the roadside system can determine that a vehicle is positioned over the inductance loop and can utilize the inductance loop to activate a roadside area network ("RSAN").

In some embodiments, the roadside system can connect a user device to the roadside system via the RSAN. The roadside system can include a connection to a network via a backhaul. The backhaul can provide one or more wireless or wired links over which the user device can communicate with the network.

In some embodiments, the network is or includes a wireless wide area network ("WWAN"). In some embodiments, the RSAN can include a small cell of the WWAN. In some embodiments, the RSAN can utilize a short-range wireless communications technology, such as BLUETOOTH or BLUETOOTH LE. In some embodiments, the RSAN can include a WI-FI access point.

In some embodiments, the roadside system can determine whether the inductance of the inductance loop has returned to the baseline. In response to determining that the inductance of the inductance loop has returned to the baseline, the roadside system can deactivate the RSAN.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The concepts and technologies disclosed herein provide wireless network enhancements via inductance loops as antennas. In some embodiments, existing inductance loops, such as those embedded in roads, can be reused, specifically leveraging the high attenuation of the inductance loops to create a short-range network at a low cost of entry. This can enable new services to be used with existing wireless technologies previously reserved for short range. A connection between two or more inductance loops combined with other forms of network transport can provide a higher bandwidth aggregate service.

A significant number of wireless service provider customers (e.g., smartphone users) are on or near roadways and aggregately are significant consumers of data. Vehicles must pass over inductance loops, either in motion or stopped. Each inductance loop will likely have one or more vehicles over it at any given time. Since inductance loops are not frequency-optimized, a high frequency signal will be highly attenuated, meaning the broadcasted signal will have a very short range, and the reception will be similarly short range. This provides several benefits for wireless service providers. For example, wireless service providers can re-use licensed spectrum, or utilize unlicensed spectrum to divert connected devices off of macro/metro cells that serve the locations at which the inductance loops are embedded, and re-allocate available licensed spectrum to other macro/metro cell devices.

The concepts and technologies disclosed herein require minimal installation effort and cost because inductance loops and various network backhauls are already in place. If inductance loops are not available at a location, the potential installation or upgrade can be cost shared between wireless service providers and the local Department of Transportation. The concepts and technologies disclosed herein can enable roadway use of public Wi-Fi, including Wi-Fi offered by, sponsored by, or otherwise associated with the wireless service provider. The concepts and technologies disclosed herein enable wide area BLUETOOTH services, such as trackers and beacons, which are not otherwise feasible in wide area solutions.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, vehicles, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of wireless network enhancements via inductance loops as antennas will be described.

Figure 1:
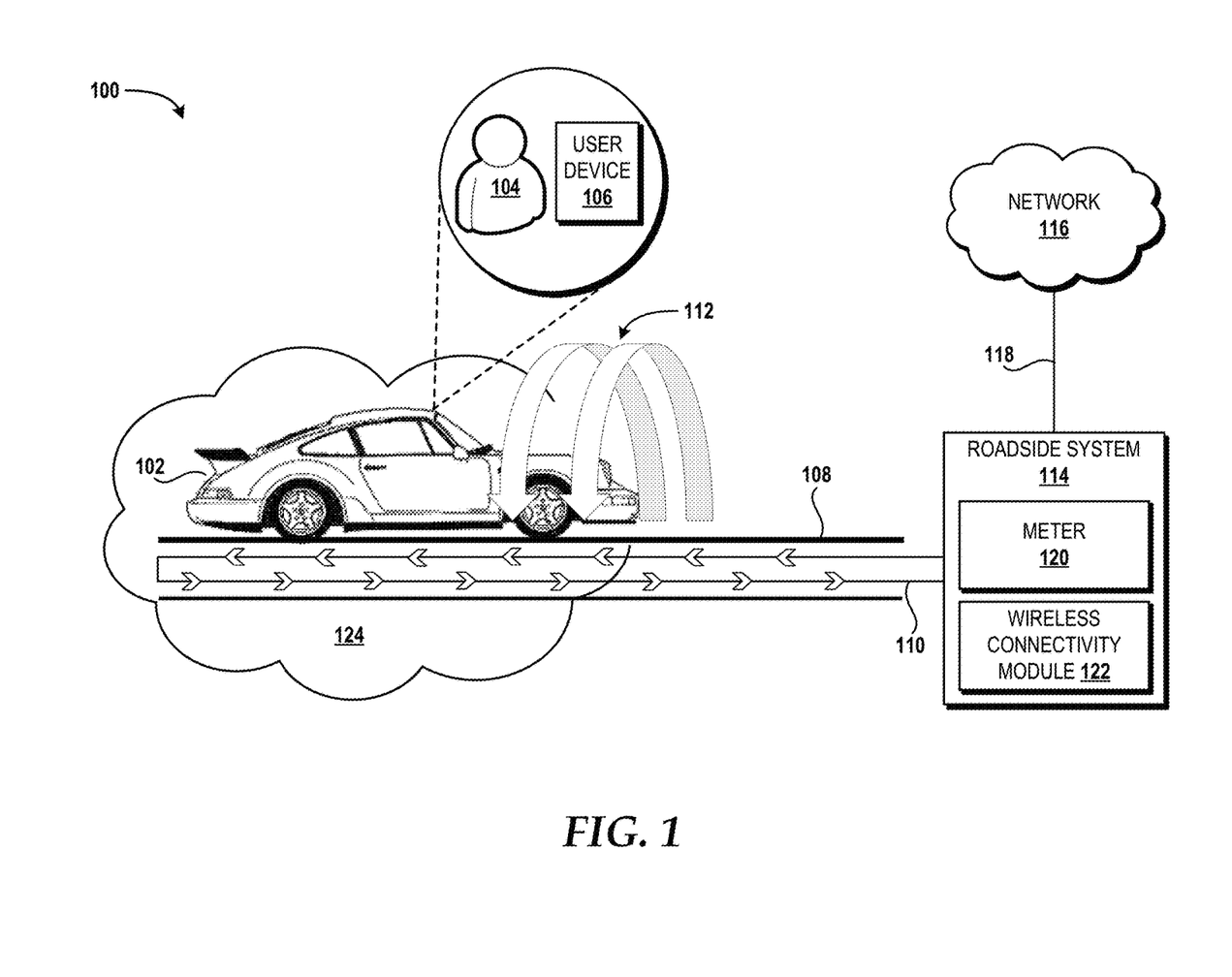
FIG. 1 is a block diagram illustrating aspects of an illustrative operating environment for various concepts disclosed herein.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from the embodiments described herein.

The operating environment 100 shown in FIG. 1 includes a vehicle 102 operated by a user 104 who is associated with a user device 106. The vehicle 102 is shown traveling along a road 108 associated with an inductance loop 110. The road 108 can be any length, in any geographical location, and can have any roadway surface type, some examples of which include, but are not limited to, asphalt, concrete, composite, rubber, recycled material, dirt, brick, rock, and the like. The road 108 can be or can include one or more structures such as fixed or movable bridges. The inductance loop 110 can be installed in the road 108 during or after construction. The inductance loop 110 can be any shape and size depending upon the needs of a particular installation, including, for example, to define a particular detection zone—that is, an area in which presence of the vehicle 102 (and/or one or more other vehicles, not shown) can be detected. The specific design of the inductance loop 110, including the materials and processes used to manufacture the inductance loop 110, is beyond the scope of this description. Those skilled in the art will appreciate the numerous design options when designing an inductance loop for a particular installation site.

When the vehicle 102 is positioned over the inductance loop 110, a magnetic field 112 is created. Some existing roads utilize inductance loops to determine whether a vehicle is present at a traffic light and for other use cases. The presence of a vehicle is determined by a meter that can detect an increase in inductance caused by the presence of a vehicle (and more particularly, the metal of the vehicle) being positioned over an inductance loop. This concept, as well as general inductance theory, are well known to those skilled in the art, and therefore will not be described in further detail herein.

In some embodiments of the concepts and technologies disclosed herein, the inductance loop 110 can be an existing inductance loop that can be reused, specifically leveraging the high attenuation of the inductance loop 110 to create a short-range network at a low cost of entry. This can enable new services to be used with existing wireless technologies previously reserved for short-range. A connection (not shown) between two or more inductance loops (also not shown) can be combined with other forms of network transport to provide a higher bandwidth aggregate service.

In the illustrated operating environment 100, the inductance loop 110 is connected to a roadside system 114 that, in turn, is connected to a network 116 via a backhaul 118. The roadside system 114 can include a meter 120 and a wireless connectivity module 122. The meter 120 can measure output of the inductance loop 110 to determine whether a vehicle, such as the vehicle 102, is present on a portion of the road 108 that includes the inductance loop 110 (hereinafter referred to as "the portion of the road 108"). In some embodiments, the meter 120 is calibrated to a baseline that represents a value indicative of a state in which no vehicle(s) 102 is/are present in the portion of the road 108. It is likely that the inductance read by the meter 120 will exhibit fluctuations. For this reason, in some embodiments, the baseline can be calibrated to encompass a range of +/−a value.

The vehicle 102 can be a car, truck, van, motorcycle, moped, go-kart, golf cart, or any other ground-based vehicle configured to transport one or more passengers and/or cargo. In some embodiments, the vehicle 102 is capable of operating in at least a partially autonomous control mode. In some embodiments, the vehicle 102 can be a fully autonomous vehicle. In some embodiments, the vehicle 102 can operate as a Level 3 or Level 4 vehicle as defined by the National Highway Traffic Safety Administration ("NHTSA"). The NHTSA defines a Level 3 vehicle as a limited self-driving automation vehicle that enables a driver to cede full control of all safety-critical functions under certain traffic or environmental conditions and in those conditions to rely heavily on the vehicle to monitor for changes in those conditions requiring transition back to driver control. The driver is expected to be available for occasional control, but with sufficiently comfortable transition time. The GOOGLE car, available from GOOGLE, is an example of a limited self-driving automation vehicle. The NHTSA defines a Level 4 vehicle as a full self-driving automation vehicle that is designed to perform all safety-critical driving functions and monitor roadway conditions for an entire trip to a destination. Such a design anticipates that the driver will provide destination or navigation input, but is not expected to be available for control at any time during the trip.

According to various embodiments, the functionality of the user device 106 may be provided by one or more mobile telephones, smartphones, tablet computers, slate computers, smart watches, fitness devices, smart glasses (e.g., the GOOGLE GLASS family of products), other wearable devices, mobile media playback devices, set top devices, navigation devices, laptop computers, notebook computers, ultrabook computers, netbook computers, server computers, computers of other form factors, computing devices of other form factors, other computing systems, other computing devices, Internet of Things ("IoT") devices, other unmanaged devices, other managed devices, and/or the like. It should be understood that the functionality of the user device 106 can be provided by a single device, by two or more similar devices, and/or by two or more dissimilar devices.

Moreover, the user device 106 can be independent of the vehicle 102 or integrated with the vehicle 102. In some embodiments, the user device 106 is configured to communicate with the vehicle 102 via a wired connection such as universal serial bus ("USB") or via a wireless connection such as BLUETOOTH. In some other embodiments, the user device 106 is integrated within the vehicle 102 such as part of a vehicle entertainment system (not shown; also commonly referred to as "infotainment"), a vehicle navigation system, a vehicle engine control unit ("ECU"), and/or another computing system of the vehicle 102. The user device 106 may be retrofitted into the vehicle 102 as aftermarket equipment or may be made available as standard or optional original equipment manufacturer ("OEM") equipment of the vehicle 102.

The network 116 can be or can include one or more wireless wide area networks ("WWANs"), which may, in turn, include one or more core networks such as a circuit-switched core network ("CS CN"), a packet-switched core network ("PS CN"), an IP multimedia subsystem ("IMS") core network, multiples thereof, and/or combinations thereof. The WWAN can utilize one or more mobile telecommunications technologies, such as, but not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other 802.XX technologies (e.g., 802.11 WI-FI), and the like. The network 116 can include one or more radio access networks ("RANs"). A RAN can utilize various channel access methods (which might or might not be used by the aforementioned standards) including, but not limited to, Time Division Multiple Access ("TDMA"), Frequency Division Multiple Access ("FDMA"), Single Carrier FDMA ("SC-FDMA"), CDMA, wideband CDMA ("W-CDMA"), Orthogonal Frequency Division Multiplexing ("OFDM"), Space Division Multiple Access ("SDMA"), and/or the like to provide a radio/air interface to the user device 106. Data communications can be provided in part by a RAN using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, a RAN may be a GSM RAN ("GRAN"), a GSM EDGE RAN ("GERAN"), a UMTS Terrestrial Radio Access Network ("UTRAN"), an E-UTRAN, any combination thereof, and/or the like.

The backhaul 118 provides one or more communication links between the roadside system 114 and the network 116. In some embodiments, the backhaul 118 includes fiber-optic cabling, coaxial cabling, twisted pair cabling, or some combination thereof to connect the roadside system 114 to the network 116. In some embodiments, the backhaul 118 is a wireless backhaul that utilizes one or more of the wireless technologies described herein above. Moreover, the backhaul 118 might include multiple redundant links using wired links, wireless links, or a combination thereof. It should be understood that the aforementioned types of linkage are merely exemplary and other types of linkage may be used to connect the roadside system 114 to the network 116.

The backhaul 118 can be used for communications between the roadside system 114 and the network 116 to exchange data unassociated with the concepts and technologies disclosed herein. For example, the roadside system 114 can use the meter 120 to determine whether the vehicle 102 is positioned over the portion of the road 108, and if so, can influence behavior of a traffic light, such as by changing the traffic light early when the vehicle 102 is alone at an intersection. The concepts and technologies disclosed herein can be implemented, at least in part, via the wireless connectivity module 122 to leverage the existing roadside system 114 and the backhaul 118. As such, a provider, such as a wireless service provider that provides one or more wireless telecommunications services to the user device 106, can partner with another provider of the roadside system 114 (e.g., a Department of Transportation) to utilize the existing roadside system 114 with the meter 120 and install the wireless connectivity module 122 therein to enable the concepts and technologies disclosed herein. In some embodiments, the backhaul 118 can be upgraded, at least in part, by the wireless service provider to support the additional functionality provided by the wireless connectivity module 122. The engineering details regarding the connectivity requirements of a given roadside system based upon the backhaul 118 configuration can vary widely, and as such, the implementation of additional or upgraded backhaul 118 and/or aspects of an existing roadside system 114 are merely design details and are not described in further detail herein.

According to various embodiments, the roadside system 114 may be provided by one or more mobile telephones, smartphones, tablet computers, slate computers, laptop computers, notebook computers, ultrabook computers, netbook computers, server computers, computers of other form factors, computing devices of other form factors, other computing systems, other computing devices, and/or the like. It should be understood that the functionality of the roadside system 114 can be provided by a single device, by two or more similar devices, and/or by two or more dissimilar devices.

The wireless connectivity module 122 can be implemented via hardware, software, or a combination thereof. The wireless connectivity module 122 can include hardware wire leads that connect directly to the inductance loop 110, or alternatively, can tap into the leads that serve the meter 120. In some embodiments, the wireless connectivity module 122 can include one or more radios, including, for example, a cellular radio, a short-range wireless communications radio, a WI-FI radio, a combination thereof, and/or the like. The inductance loop 110 connected to the roadside system 114 via the wireless connectivity module 122 can form, at least in part, one or more antennas for one or more of the aforementioned radios. The radios can be hardware and/or software-based.

In response to induction measured by the meter 120 being indicative of the vehicle 102 being positioned over the inductance loop 110 (i.e., the inductance value being above a pre-defined baseline such as described above), the wireless connectivity module 122 can activate a roadside area network ("RSAN") 124. In some embodiments, the RSAN 124 provides, at least in part, a small cell to be used as part of the cellular architecture of the network 116. In some other embodiments, the RSAN 124 provides, at least in part, a short-range wireless telecommunications technology, such as BLUETOOTH or BLUETOOTH LE, by which the user device 106 with a compatible short-range wireless telecommunications radio can communicate with the roadside system 114. In some other embodiments, the RSAN 124 provides, at least in part, a WI-FI access point. Additional details regarding these embodiments will be described herein below with reference to the methods introduced in FIGS. 2-5.

It should be understood that some implementations of the operating environment 100 can include multiple vehicles 102, multiple users 104, multiple user devices 106, multiple roads 108, multiple inductance loops 110, multiple electromagnetic fields 112, multiple roadside systems 114, multiple networks 116, multiple backhauls 118, multiple meters 120, multiple wireless connectivity modules 122, multiple RSANs 124, or some combination thereof. Thus, the illustrated embodiment should be understood as being illustrative, and should not be construed as being limiting in any way.

Figure 2:
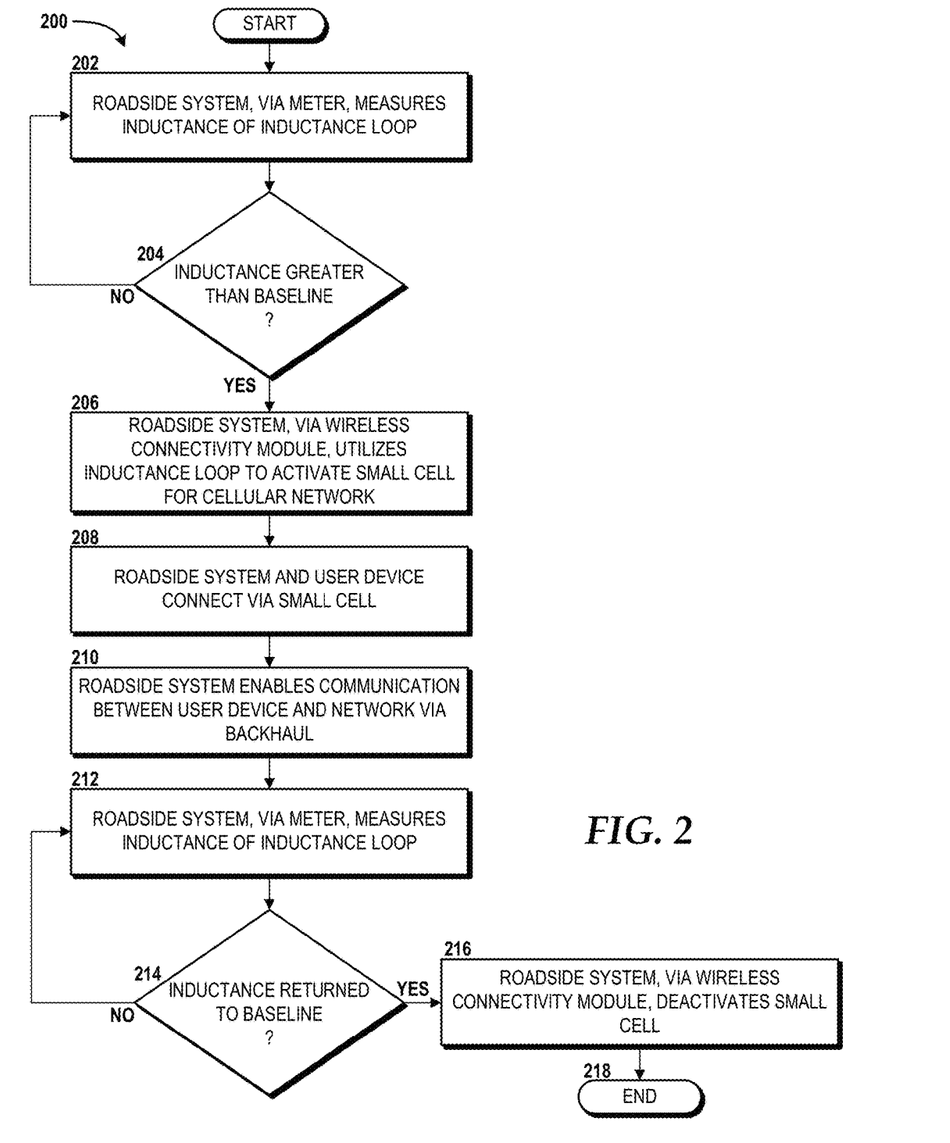
FIG. 2 is a flow diagram illustrating aspects of a method for providing wireless connectivity via an inductance loop, according to an illustrative embodiment of the concepts and technologies disclosed herein.

Turning now to FIG. 2, a flow diagram illustrating aspects of a method 200 for providing wireless connectivity via an inductance loop, such as the inductance loop 110, will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems or devices, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors of the roadside system 114 and/or one or more other computing systems and/or devices disclosed herein to perform operations.

For purposes of illustrating and describing some of the concepts of the present disclosure, the methods disclosed herein are described as being performed, at least in part, by the roadside system 114 via execution of one or more software modules. In some embodiments, the meter 120 and/or the wireless connectivity module 122 are implemented, at least in part, as software modules. Additional hardware, such as radios, transmitters, receivers, antennas, and/or the like, also can be included as part of the roadside system 114 and utilized by the software modules via execution by one or more processors. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 will be described with reference to FIG. 2 and further reference to FIG. 1. The method 200 begins and proceeds to operation 202, where the roadside system 114, via the meter 120, measures inductance of the inductance loop 110. From operation 202, the method 200 proceeds to operation 204, where the roadside system 114 determines if the inductance measured by the meter 120 is greater than a pre-defined baseline value for inductance of the inductance loop 110. As explained above, the pre-defined baseline value of inductance can be associated with the inductance loop 110 when a vehicle, such as the vehicle 102, is not positioned over the portion of the road 108. If the roadside system 114 determines, at operation 204, that the inductance of the inductance loop 110 is less than the baseline value, the method 200 returns to operation 202. This condition is indicative of the vehicle 102 not being positioned over the portion of the road 108. If, however, the roadside system 114 determines, at operation 204, that the inductance of the inductance loop 110 is greater than the baseline value, the method 200 proceeds to operation 206, where the roadside system 114, via the wireless connectivity module 122, utilizes the inductance loop 110 to activate a small cell for a cellular network. In this embodiment, the inductance loop 110 forms, at least in part, an antenna through which the user device 106 can communicate with the RSAN 124, which is embodied as a small cell. In this manner, the user device 106 can communicate with the small cell when the vehicle 102 is stopped, thereby reducing overhead of the macro cell of the RAN that serves the location of the vehicle 102. Responsive to detecting induction in the inductance loop 110, the wireless connectivity module 122 can activate one or more radios that utilize the inductance loop 110 as an antenna to provide the small cell.

From operation 206, the method 200 proceeds to operation 208, where the roadside system 114 and the user device 106 connect via the small cell. From operation 208, the method 200 proceeds to operation 210, where the roadside system 114 enables communication between the user device 106 and the network 116 via the backhaul 118. Traffic from the user device 106 can be sent to the roadside system 114 over the small cell, via the wireless connectivity module 122, which can relay the traffic to the network 116 via the backhaul 118. Likewise, traffic to the user device 106 can be sent by the network 116 to the roadside system 114 via the backhaul 118. As such, the RSAN 124 becomes a small cell operating as part of the RAN that serves the location that includes the inductance loop 110. Radio resource control can be delegated to a neighboring eNB in E-UTRAN or a radio network controller ("RNC") that serves a neighboring node-B in UTRAN.

From operation 210, the method 200 proceeds to operation 212, where the roadside system 114 uses the meter 120 to measure inductance of the inductance loop 110. From operation 212, the method 200 proceeds to operation 214, where the roadside system 114 determines if the inductance of the inductance loop 110 has returned to the baseline. If not, the method 200 returns to operation 212, where the roadside system 114 continues to measure inductance of the inductance loop 110. If, however, the roadside system 114 determines that the inductance of the inductance loop 110 has returned to the baseline, the method 200 proceeds to operation 216, where the roadside system 114, via the wireless connectivity module 122, deactivates the small cell. Responsive to detecting induction in the inductance loop 110 has returned to the baseline, the wireless connectivity module 122 can deactivate the radio(s). From operation 216, the method 200 proceeds to operation 218. The method 200 ends at operation 218.

Figure 3:
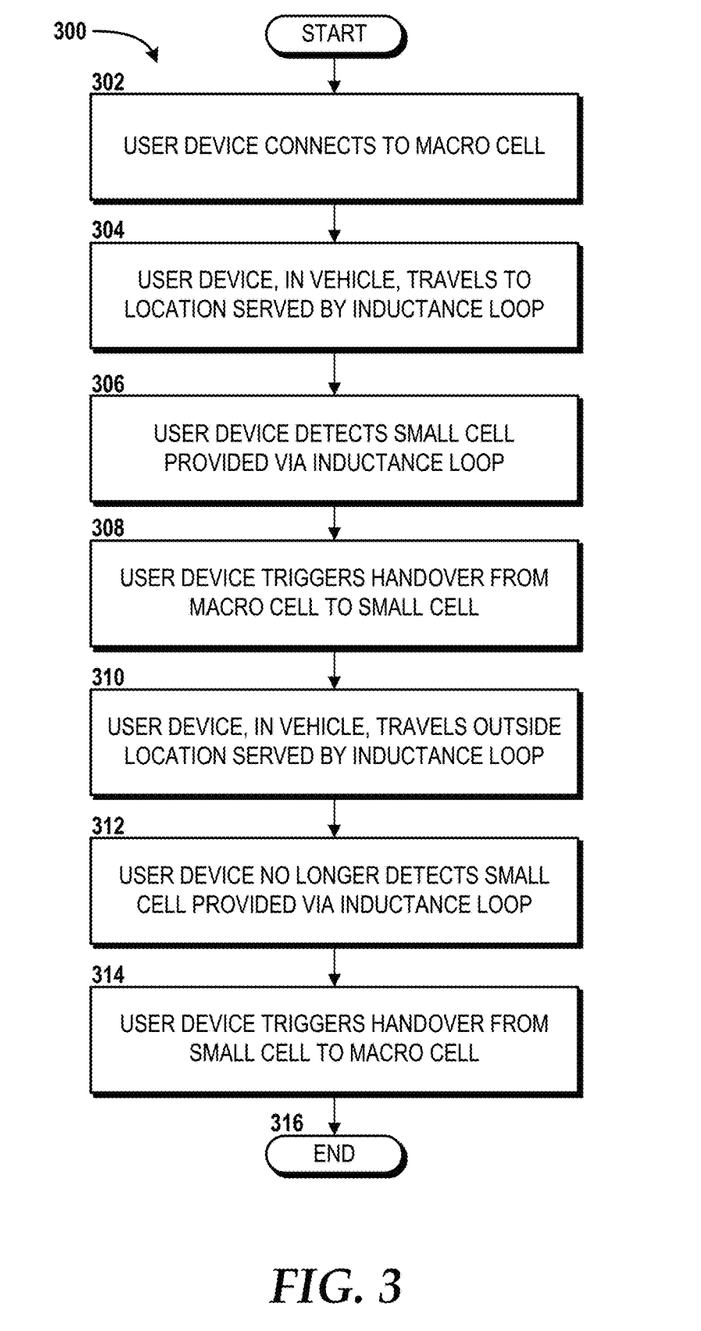
FIG. 3 is a flow diagram illustrating aspects of a method for handover between a small cell provided via an inductance loop and a macro cell, according to an illustrative embodiment of the concepts and technologies disclosed herein.

Turning now to FIG. 3, a method 300 for handover between a small cell provided via the inductance loop 110 and a macro cell of the network 116 will be described, according to an illustrative embodiment of the concepts and technologies disclosed herein. The method 300 will be described with reference to FIG. 3 and further reference to FIG. 1. The method 300 begins and proceeds to operation 302, where the user device 106 connects to a macro cell of the network 116. From operation 302, the method 300 proceeds to operation 304, where the user device 106, in the vehicle 102, travels to a location served by the inductance loop 110—that is, the portion of the road 108 as illustrated and described above with reference to FIG. 1.

From operation 304, the method 300 proceeds to operation 306, where the user device 106 detects the small cell provided via the RSAN 124 created by the inductance loop 110. From operation 306, the method 300 proceeds to operation 308, where the user device 106 triggers handover from the macro cell to the small cell. From operation 308, the method 300 proceeds to operation 310, where the user device 106, in the vehicle 102, travels outside of the location served by the inductance loop 110.

From operation 310, the method 300 proceeds to operation 312, where the user device 106 no longer detects the small cell. From operation 312, the method 300 proceeds to operation 314, where the user device 106 triggers handover from the small cell to the macro cell of the network 116. From operation 314, the method 300 proceeds to operation 316. The method 300 ends at operation 316.

Figure 4:
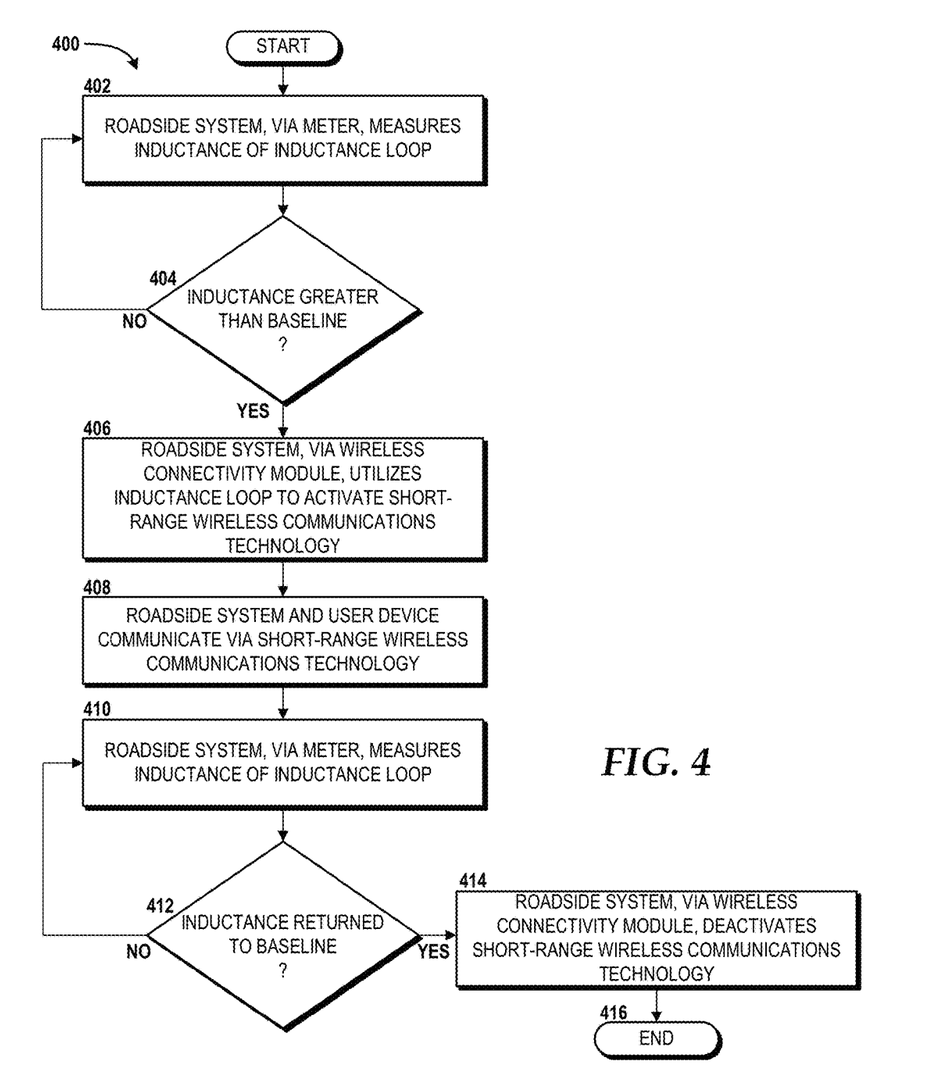
FIG. 4 is a flow diagram illustrating aspects of another method for providing wireless connectivity via an inductance loop, according to an illustrative embodiment of the concepts and technologies disclosed herein.

Turning now to FIG. 4, another method 400 for providing wireless connectivity via an inductance loop will be described, according to an illustrative embodiment of the concepts and technologies disclosed herein. The method 400 will be described with reference to FIG. 4 and further reference to FIG. 1. The method 400 begins and proceeds to operation 402, where the roadside system 114, via the meter 120, measures inductance of the inductance loop 110. From operation 402, the method 400 proceeds to operation 404, where the roadside system 114 determines if the inductance measured by the meter 120 is greater than a pre-defined baseline value for inductance of the inductance loop 110. As explained above, the pre-defined baseline value of inductance can be associated with the inductance loop 110 when a vehicle, such as the vehicle 102, is not positioned over the portion of the road 108. If the roadside system 114 determines, at operation 404, that the inductance of the inductance loop 110 is less than the baseline value, the method 400 returns to operation 402. This condition is indicative of the vehicle 102 not being positioned over the portion of the road 108. If, however, the roadside system 114 determines, at operation 404, that the inductance of the inductance loop 100 is greater than the baseline value, the method 400 proceeds to operation 406, where the roadside system 114, via the wireless connectivity module 122, utilizes the inductance loop 110 to activate a short-range wireless communication technology, such as, but not limited to, BLUETOOTH or BLUETOOTH LE. In this embodiment, the inductance loop 110 forms, at least in part, an antenna through which the user device 106 can communicate with the RSAN 124, which is embodied as a BLUETOOTH or BLUETOOTH LE network. The user device 106 can communicate with the roadside system 114 when the vehicle 102 is stopped and the user device 106 is being used to share data. In some embodiments, the roadside system 114 can relay information received from the user device 106 to the network 116 via the backhaul 118. In this manner, the user device 106 can have a network connection even when connectivity is otherwise unavailable (e.g., a poor cellular coverage area). From operation 406, the method 400 proceeds to operation 408, where the roadside system 114 and the user device 106 connect via the short-range wireless communications technology.

From operation 408, the method 400 proceeds to operation 410, where the roadside system 114 uses the meter 120 to measure inductance of the inductance loop 110. From operation 410, the method 400 proceeds to operation 412, where the roadside system 114 determines if the inductance of the inductance loop 110 has returned to the baseline. If not, the method 400 returns to operation 410, where the roadside system 114 continues to measure inductance of the inductance loop 110. If, however, the roadside system 114 determines that the inductance of the inductance loop 110 has returned to the baseline, the method 400 proceeds to operation 414, where the roadside system 114, via the wireless connectivity module 122, deactivates the short-range wireless communications technology. From operation 414, the method 400 proceeds to operation 416. The method 400 ends at operation 416.

Figure 5:
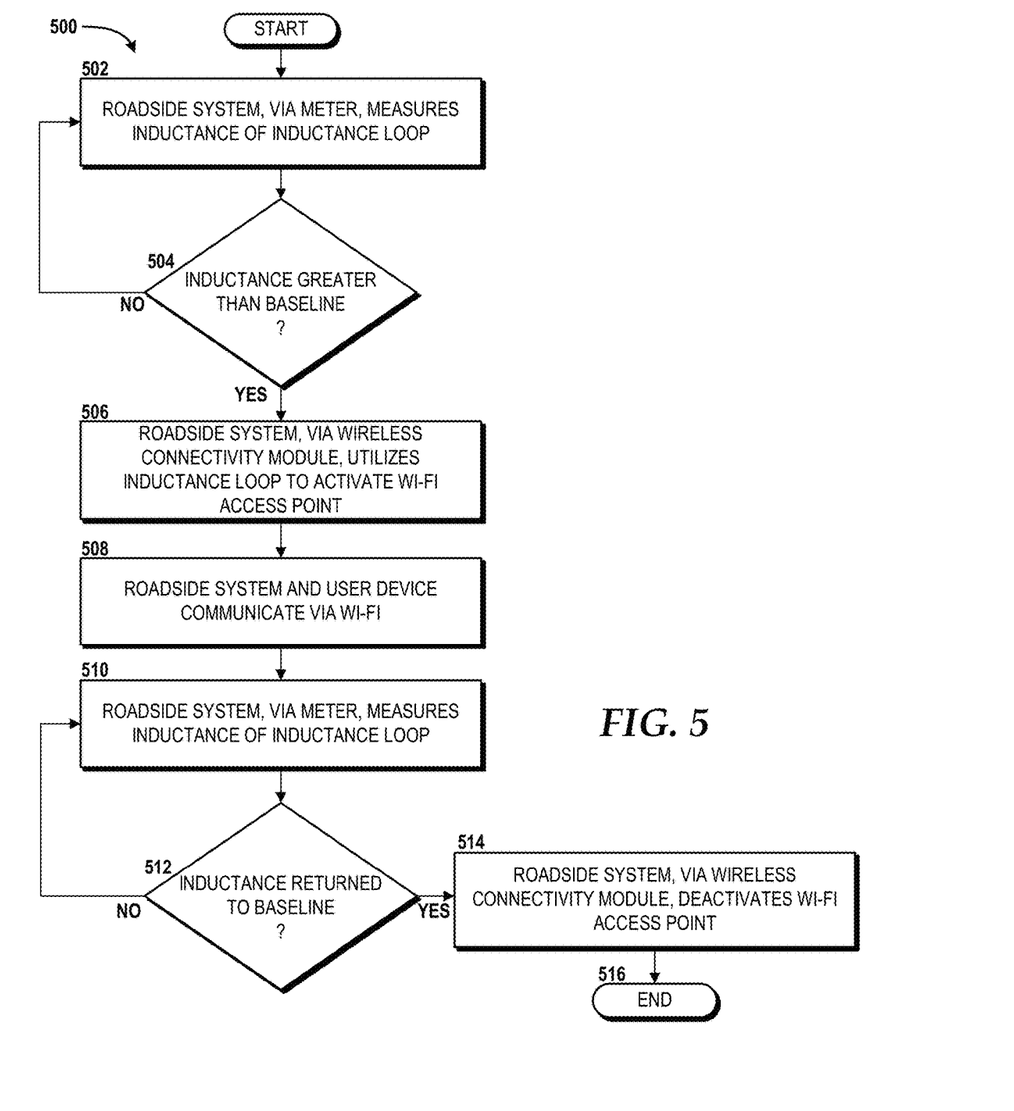
FIG. 5 is a flow diagram illustrating aspects of another method for providing wireless connectivity via an inductance loop, according to an illustrative embodiment of the concepts and technologies disclosed herein.

Turning now to FIG. 5, another method 500 for providing wireless connectivity via an inductance loop will be described, according to an illustrative embodiment of the concepts and technologies disclosed herein. The method 500 will be described with reference to FIG. 5 and further reference to FIG. 1. The method 500 begins and proceeds to operation 502, where the roadside system 114, via the meter 120, measures inductance of the inductance loop 110. From operation 502, the method 500 proceeds to operation 504, where the roadside system 114 determines if the inductance measured by the meter 120 is greater than a pre-defined baseline value for inductance of the inductance loop 110. As explained above, the pre-defined baseline value of inductance can be associated with the inductance loop 110 when a vehicle, such as the vehicle 102, is not positioned over the portion of the road 108. If the roadside system 114 determines, at operation 504, that the inductance of the inductance loop 110 is less than the baseline value, the method 500 returns to operation 502. This condition is indicative of the vehicle 102 not being positioned over the portion of the road 108. If, however, the roadside system 114 determines, at operation 504, that the inductance of the inductance loop 100 is greater than the baseline value, the method 500 proceeds to operation 506, where the roadside system 114, via the wireless connectivity module 122, utilizes the inductance loop 110 to activate a WI-FI access point. In this embodiment, the inductance loop 110 forms, at least in part, an antenna through which the user device 106 can communicate with the RSAN 124, which is embodied as a WI-FI network. From operation 506, the method 500 proceeds to operation 508, where the roadside system 114 and the user device 106 communicate via WI-FI.

From operation 508, the method 500 proceeds to operation 510, where the roadside system 114 uses the meter 120 to measure inductance of the inductance loop 110. From operation 510, the method 500 proceeds to operation 512, where the roadside system 114 determines if the inductance of the inductance loop 110 has returned to the baseline. If not, the method 500 returns to operation 510, where the roadside system 114 continues to measure inductance of the inductance loop 110. If, however, the roadside system 114 determines that the inductance of the inductance loop 110 has returned to the baseline, the method 500 proceeds to operation 514, where the roadside system 114, via the wireless connectivity module 122, deactivates the WI-FI access point. From operation 514, the method 500 proceeds to operation 516. The method 500 ends at operation 516.

Figure 6:
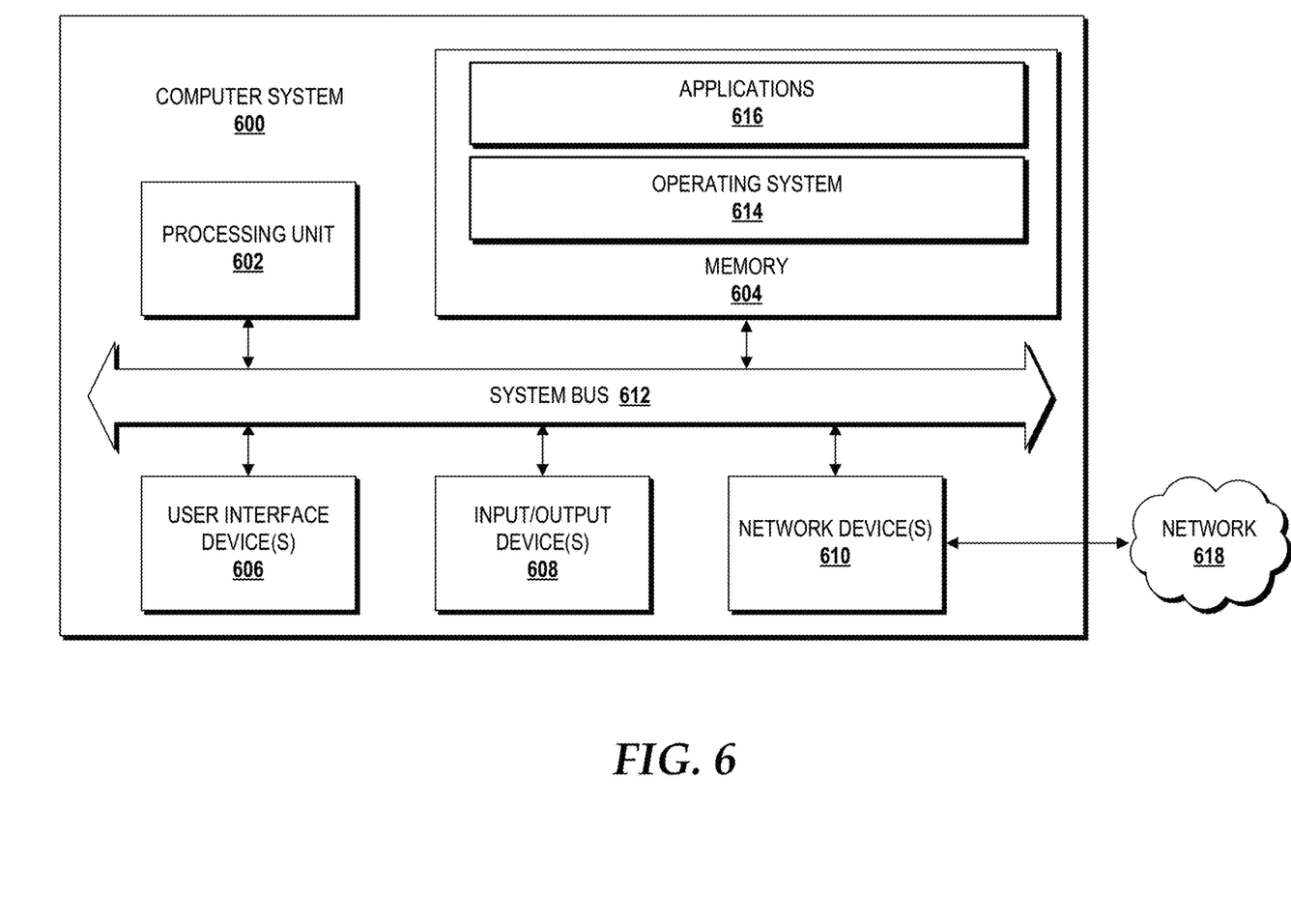
FIG. 6 is a block diagram illustrating an example computer system capable of implementing aspects of the embodiments presented herein.

FIG. 6 is a block diagram illustrating a computer system 600 configured to perform various operations disclosed herein. The computer system 600 includes a processing unit 602, a memory 604, one or more user interface devices 606, one or more input/output ("I/O") devices 608, and one or more network devices 610, each of which is operatively connected to a system bus 612. The system bus 612 enables bi-directional communication between the processing unit 602, the memory 604, the user interface devices 606, the I/O devices 608, and the network devices 610. In some embodiments, the user device 106, one or more components of the user vehicle 102, the roadside system 114, or some combination thereof is/are configured, at least in part, like the computer system 600. It should be understood, however, that the user device 106, one or more components of the user vehicle 102, and/or the roadside system 114 may include additional functionality or include less functionality than now described.

The processing unit 602 might be a standard central processor that performs arithmetic and logical operations, a more specific purpose programmable logic controller ("PLC"), a programmable gate array, or other type of processor known to those skilled in the art and suitable for controlling the operation of the computer system 600. Processing units are generally known, and therefore are not described in further detail herein.

The memory 604 communicates with the processing unit 602 via the system bus 612. In some embodiments, the memory 604 is operatively connected to a memory controller (not shown) that enables communication with the processing unit 602 via the system bus 612. The illustrated memory 604 includes an operating system 614 and one or more applications 616.

The operating system 614 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 606 may include one or more devices with which a user accesses the computer system 600. The user interface devices 606 may include, but are not limited to, computers, servers, personal digital assistants, telephones (e.g., cellular, IP, or landline), or any suitable computing devices. The I/O devices 608 enable a user to interface with the program modules. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, a touchscreen, or an electronic stylus. Further, the I/O devices 608 may include one or more output devices, such as, but not limited to, a display screen or a printer.

The network devices 610 enable the computer system 600 to communicate with other networks or remote systems via a network 618 (e.g., the network 116). Examples of the network devices 610 include, but are not limited to, a modem, a radio frequency ("RF") or infrared ("IR") transceiver, a telephonic interface, a bridge, a router, or a network card. The network 618 may include a wireless network such as, but not limited to, a WLAN such as a WI-FI network, a WWAN, a wireless PAN ("WPAN") such as BLUETOOTH, or a wireless MAN ("WMAN"). Alternatively, the network 618 may be a wired network such as, but not limited to, a WAN such as the Internet, a LAN such as the Ethernet, a wired PAN, or a wired MAN.

Figure 7:
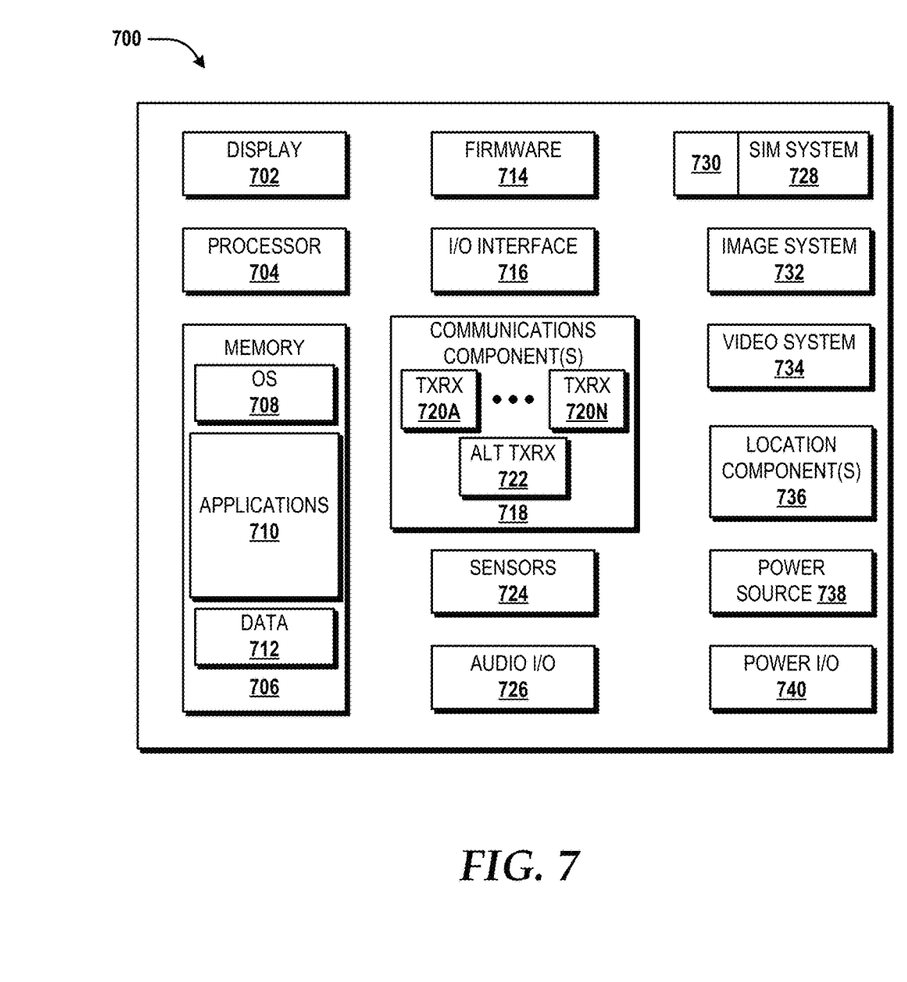
FIG. 7 is a block diagram illustrating an example mobile device capable of implementing aspects of the embodiments disclosed herein.

Turning now to FIG. 7, an illustrative mobile device 700 and components thereof will be described. In some embodiments, the user device 106 and/or the roadside system 114 described above with reference to FIG. 1 can be configured as and/or can have an architecture similar or identical to the mobile device 700 described herein in FIG. 7. It should be understood, however, that the user device 106 and/or the roadside system 114 may or may not include the functionality described herein with reference to FIG. 7. While connections are not shown between the various components illustrated in FIG. 7, it should be understood that some, none, or all of the components illustrated in FIG. 7 can be configured to interact with one another to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display network connection information, various graphical user interface ("GUI") elements, text, images, video, virtual keypads and/or keyboards, messaging data, notification messages, metadata, Internet content, device status, time, date, calendar data, device preferences, map and location data, combinations thereof, and/or the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710, other computer-executable instructions stored in the memory 706, or the like. In some embodiments, the applications 710 also can include a UI application (not illustrated in FIG. 7).

The UI application can interface with the operating system 708 to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in data communications, entering/deleting data, entering and setting user IDs and passwords for device access, configuring settings, manipulating content and/or settings, multimode interaction, interacting with other applications 710, and otherwise facilitating user interaction with the operating system 708, the applications 710, and/or other types or instances of data 712 that can be stored at the mobile device 700.

The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as location information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1374 ("FIREWIRE") port, a serial port, a parallel port, an Ethernet (RJ45) port, an RJ11 port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as the network 116 described herein. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments, one or more of the transceivers of the communications component 718 may be configured to communicate using GSM, CDMAONE, CDMA2000, LTE, and various other 2G, 2.5G, 3G, 4G, 4.5G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 717 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-720N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 700 or other devices or computers described herein, such as the computer system 700 described above with reference to FIG. 7. For purposes of the claims, the phrase "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 700 in order to store and execute the software components presented herein. It is also contemplated that the Mobile device 700 may not include all of the components shown in FIG. 7, may include other components that are not explicitly shown in FIG. 7, or may utilize an architecture completely different than that shown in FIG. 7.

Figure 8:
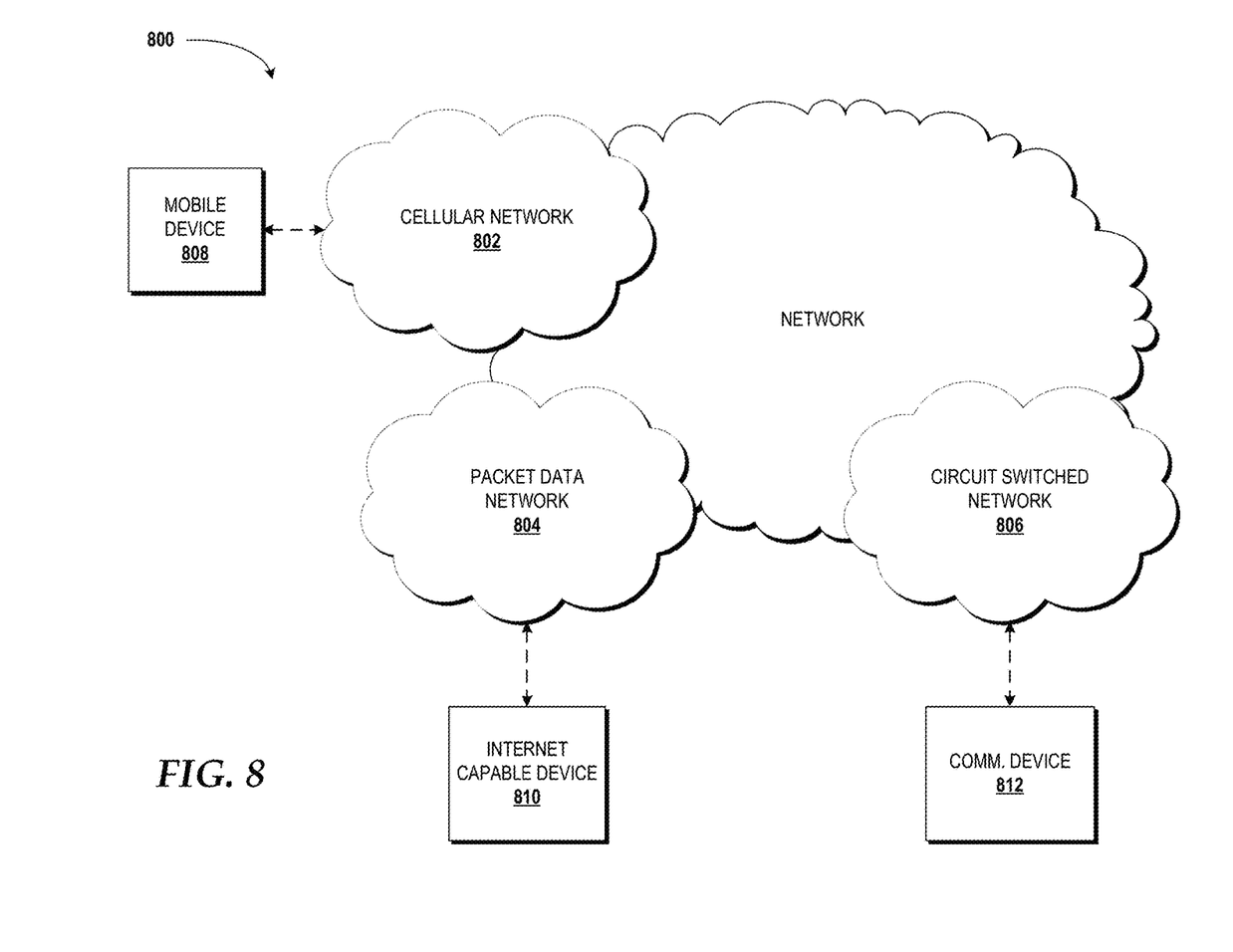
FIG. 8 is a diagram illustrating a network, according to an illustrative embodiment.

Turning now to FIG. 8, details of a network 800 are illustrated, according to an illustrative embodiment. The network 800 includes a cellular network 802, a packet data network 804, and a circuit switched network 806 (e.g., a public switched telephone network). The network 800 can include the network 116 illustrated and described with reference to FIG. 1.

The cellular network 802 includes various components such as, but not limited to, base transceiver stations ("BTSs"), Node-Bs or e-Node-Bs, base station controllers ("BSCs"), radio network controllers ("RNCs"), mobile switching centers ("MSCs"), mobility management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, and the like. The cellular network 802 also includes radios and nodes for receiving and transmitting voice, data, and combinations thereof to and from radio transceivers, networks, the packet data network 804, and the circuit switched network 806.

A mobile communications device 806, such as, for example, a cellular telephone, a user equipment, a mobile terminal, a PDA, a laptop computer, a handheld computer, the user device 106, and combinations thereof, can be operatively connected to the cellular network 802. The cellular network 802 can be configured as a 2G GSM network and can provide data communications via GPRS and/or EDGE. Additionally, or alternatively, the cellular network 802 can be configured as a 3G UMTS network and can provide data communications via the HSPA protocol family, for example, HSDPA, EUL (also referred to as HSUPA), and HSPA+. The cellular network 802 also is compatible with 4G mobile communications standards such as LTE, or the like, as well as evolved and future mobile standards.

The packet data network 804 includes various devices, for example, servers, computers, databases, and other devices in communication with one another, as is generally known. In some embodiments, the packet data network 804 is or includes one or more WI-FI networks, each of which can include one or more WI-FI access points, routers, switches, and other WI-FI network components. The packet data network 804 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 804 includes or is in communication with the Internet. The circuit switched network 806 includes various hardware and software for providing circuit switched communications. The circuit switched network 806 may include, or may be, what is often referred to as a plain old telephone system ("POTS"). The functionality of a circuit switched network 806 or other circuit-switched network are generally known and will not be described herein in detail.

The illustrated cellular network 802 is shown in communication with the packet data network 804 and a circuit switched network 806, though it should be appreciated that this is not necessarily the case. One or more Internet-capable devices 810, for example, the user device 106, the roadside system 114, a PC, a laptop, a portable device, or another suitable device, can communicate with one or more cellular networks 802, and devices connected thereto, through the packet data network 804. It also should be appreciated that the Internet-capable device 810 can communicate with the packet data network 804 through the circuit switched network 806, the cellular network 802, and/or via other networks (not illustrated).

As illustrated, a communications device 812, for example, a telephone, facsimile machine, modem, computer, or the like, can be in communication with the circuit switched network 806, and therethrough to the packet data network 804 and/or the cellular network 802. It should be appreciated that the communications device 812 can be an Internet-capable device, and can be substantially similar to the Internet-capable device 810.

Based on the foregoing, it should be appreciated that concepts and technologies for wireless network enhancements via inductance loops as antennas have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

We claim:

1. A roadside system comprising:
a processor; and
memory having computer-executable instructions stored thereon that, when executed by the processor, cause the processor to perform operations comprising:
measuring, via a meter, inductance of an inductance loop associated with a road,
determining whether the inductance of the inductance loop is greater than a baseline,
in response to determining that the inductance of the inductance loop is greater than the baseline, determining that a vehicle is positioned over the inductance loop, and utilizing the inductance loop to activate a roadside area network, connecting to a user device via the roadside area network, enabling communication between the user device and a network via a backhaul, determining whether the inductance of the inductance loop has returned to the baseline, and in response to determining that the inductance of the inductance loop has returned to the baseline, deactivating the roadside area network.

2. The roadside system of claim 1, wherein the network comprises a wireless wide area network.

3. The roadside system of claim 2, wherein the roadside area network comprises a small cell of the wireless wide area network.

4. The roadside system of claim 1, wherein the roadside area network utilizes a short-range wireless communications technology.

5. The roadside system of claim 1, wherein the roadside area network comprises a WI-FI access point.

6. A computer-readable storage medium having computer-executable instructions stored thereon that, when executed by a processor of a roadside system, cause the roadside system to perform operations comprising:

measuring via a meter, inductance of an inductance loop associated with a road;

determining whether the inductance of the inductance loop is greater than a baseline;

in response to determining that the inductance of the inductance loop is greater than the baseline, determining that a vehicle is positioned over the inductance loop, and utilizing the inductance loop to activate a roadside area network;

connecting a user device to the roadside system via the roadside area network;

enabling communication between the user device and a network via a backhaul;

determining whether the inductance of the inductance loop has returned to the baseline; and in response to determining that the inductance of the inductance loop has returned to the baseline, deactivating the roadside area network.

7. The computer-readable storage medium of claim 6, wherein the network comprises a wireless wide area network.

8. The computer-readable storage medium of claim 7, wherein the roadside area network comprises a small cell of the wireless wide area network.

9. The computer-readable storage medium of claim 6, wherein the roadside area network utilizes a short-range wireless communications technology.

10. The computer-readable storage medium of claim 6, wherein the roadside area network comprises a WI-FI access point.

11. A method comprising:

measuring, via a meter of a roadside system comprising a processor, inductance of an inductance loop associated with a road;

determining, by the roadside system, whether the inductance of the inductance loop is greater than a baseline;

in response to determining that the inductance of the inductance loop is greater than the baseline, determining, by the roadside system, that a vehicle is positioned over the inductance loop, and utilizing the inductance loop to activate a roadside area network;

connecting, by the roadside system, a user device to the roadside system via the roadside area network;

enabling, by the roadside system, communication between the user device and a network via a backhaul; and in response to determining that the inductance of the inductance loop has returned to the baseline, deactivating the roadside area network.

12. The method of claim 11, wherein the network comprises a wireless wide area network.

13. The method of claim 12, wherein the roadside area network comprises a small cell of the wireless wide area network;

the roadside area network utilizes a short-range wireless communications technology; or the roadside area network comprises a WI-FI access point.

* * * * *